Oct. 25, 1955 — J. R. OISHEI — 2,721,352
WINDSHIELD WIPER HAVING AN AUTOMATIC SPEED CONTROL
Filed Oct. 27, 1952 — 3 Sheets-Sheet 1
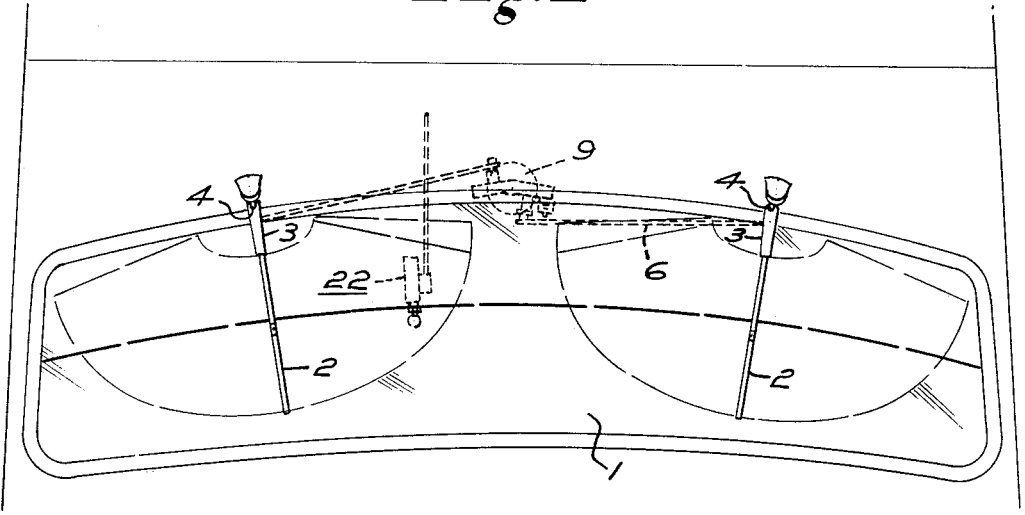
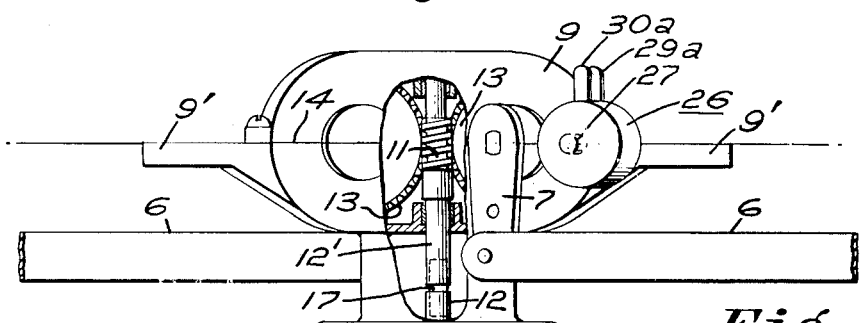
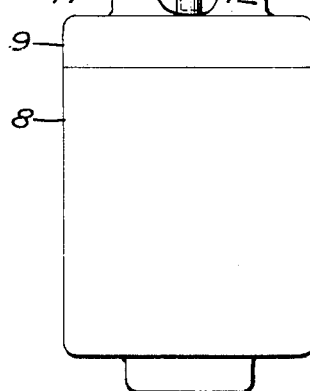
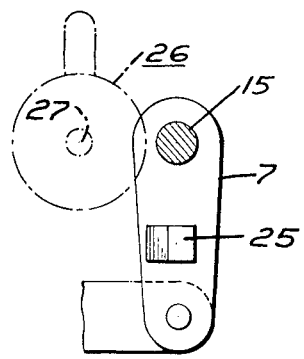
INVENTOR.
John R. Oishei,
BY
Beau, Brooks, Buckley & Beau.
ATTORNEYS.

Oct. 25, 1955   J. R. OISHEI   2,721,352
WINDSHIELD WIPER HAVING AN AUTOMATIC SPEED CONTROL
Filed Oct. 27, 1952   3 Sheets-Sheet 2
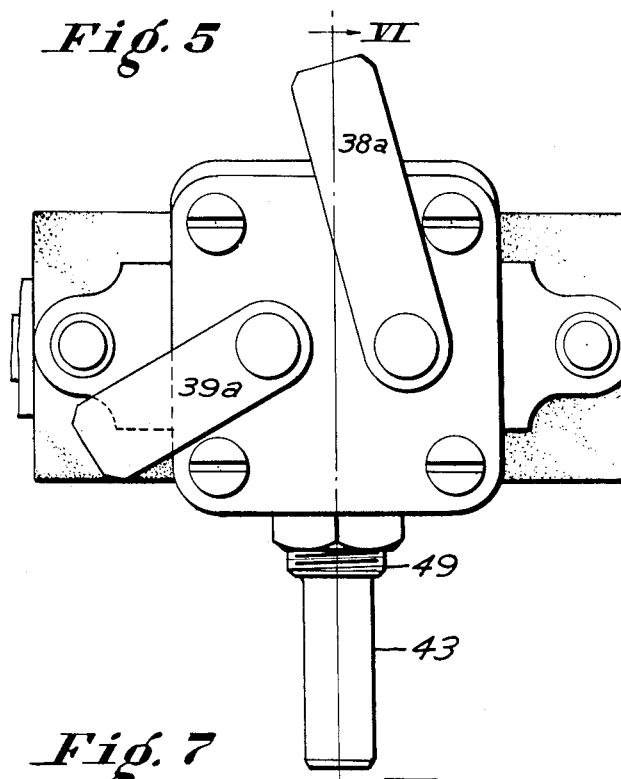
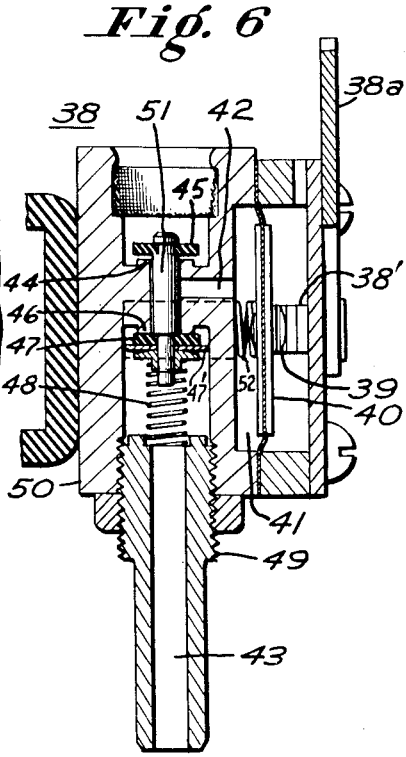
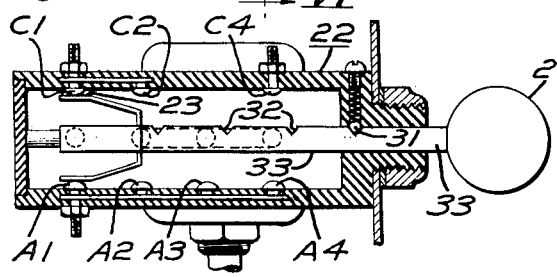
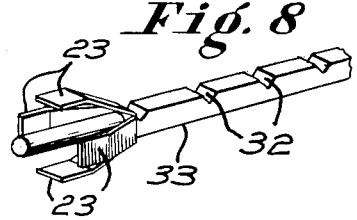
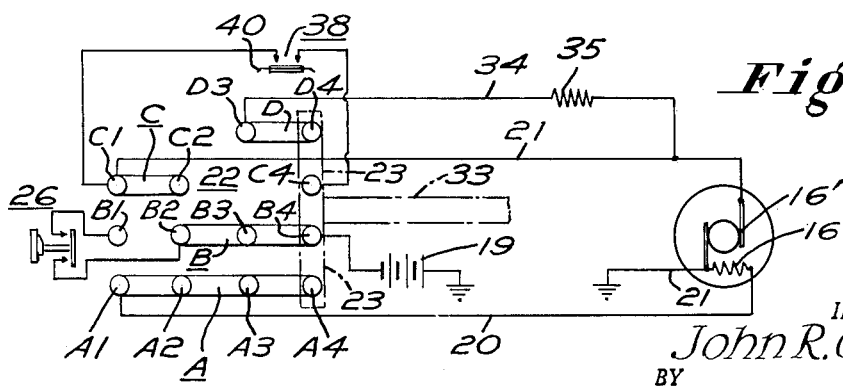
INVENTOR.
John R. Oishei,
BY
Beau, Brooks, Buckley & Beau.
ATTORNEYS.

Oct. 25, 1955     J. R. OISHEI     2,721,352
WINDSHIELD WIPER HAVING AN AUTOMATIC SPEED CONTROL
Filed Oct. 27, 1952     3 Sheets-Sheet 3
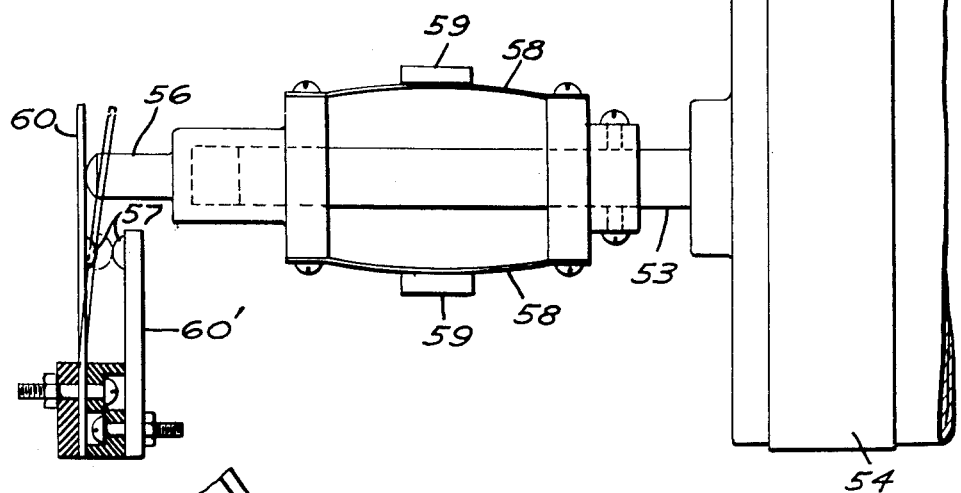
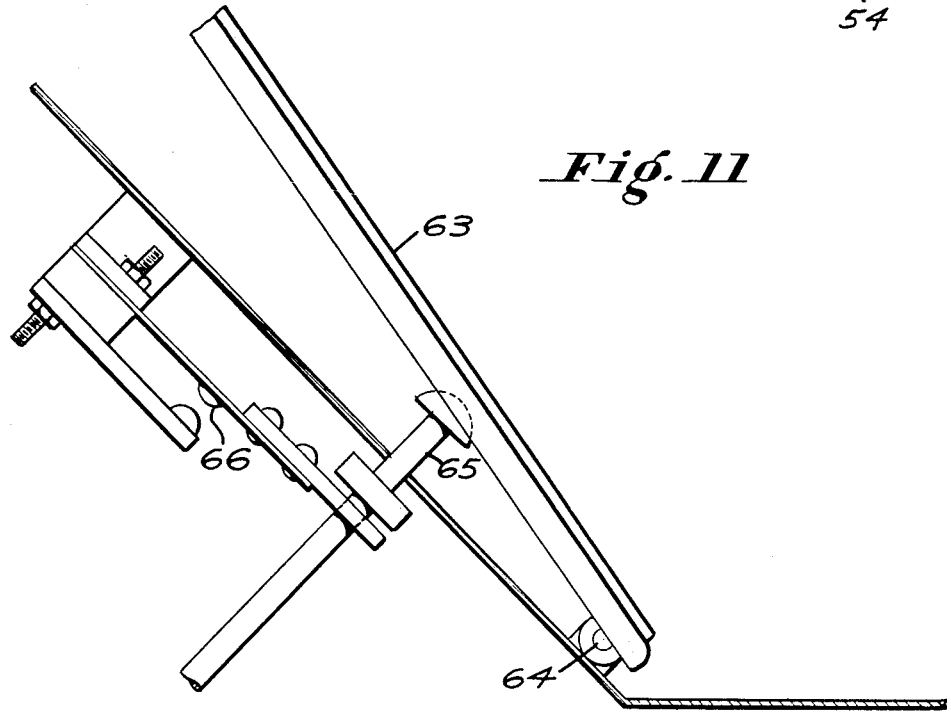
INVENTOR.
John R. Oishei,
BY
Beau, Brooks, Buckley & Beau.
ATTORNEYS.

United States Patent Office 2,721,352
Patented Oct. 25, 1955

2,721,352
WINDSHIELD WIPER HAVING AN AUTOMATIC SPEED CONTROL

John R. Oishei, Buffalo, N. Y., assignor to Trico Products Corporation, Buffalo, N. Y.

Application October 27, 1952, Serial No. 316,961

17 Claims. (Cl. 15—253)

This invention relates to an electrically operated windshield cleaner wherein the wiper is oscillated from and by an electric motor. In the past the wiper of the cleaner has been oscillated in one or another or relatively constant speeds under the optional control of the driver. In any of these preset speeds the relatively constant speed of operation develops a rhythmical noise and effect, both of which are decidedly objectionable and hazardous to safety because of their tendency to promote sleepiness on the part of the driver. Under ordinary conditions of driving there is a slight but gradual change in the speed of the wiper due to variations in the voltage in the electrical system, depending on whether the generator is driving current into a battery that does not have any load taken from it or whether the engine is idling and a lot of accessories are pulling from the battery. These changes, however, are seldom noticed. The gradual changes fail to have the necessary effect of producing a sudden change in the rhythm of wiper operation. A further disadvantage of a constant one-speed wiper operation is that while it functions efficiently for normal driving it may prove insufficient to maintain clear vision ahead when accelerating to overtake a speeding vehicle.

The instant invention provides automatic means for varying the wiper speed incidental upon other factors of driving, particularly the accelerating power of the engine. Advantage is taken of this variation in wiper speed to provide the driver with a more frequent wipe during the times when he is accelerating the car into a higher speed of operation. This frequent change from one speed of wiper operation to another effectively breaks up the rhythm of its operation and thereby removes some of the "lullaby effect" of the electrically driven windshield wiper and its motor. The stepping up of the wiper speed insures, to a greater degree, a clear field forward.

Another objective here is to provide a faster wiper action while the car is traveling fast and a slower wiper action when the car is moving slower, or has momentarily stopped as at traffic signals.

The instant invention also provides a windshield cleaner system which can be preset for automatic operation, wherein the speed of the windshield wiper operation will vary back and forth frequently with changes in the position of the throttle of the car engine. This change of speed back and forth is preferably an abrupt one for it to become of value as a means of breaking up the monotony. To accomplish this objective, means are provided to regulate the influence of electric current upon the electric motor by means of an engine speed responsive control or by a control responsive to one of the engine controls. This will result in speeding up and slowing down the wiper action. A range of definite wiper speeds may be predetermined by utilizing one or more resistors in the motor control circuit for being automatically cut in or out. Manual means likewise are provided to selectively set the wiper at a top speed or at a low speed for constant high or low speed wiper operation independently of the automatic control.

One form of an automatic means may consist of a diaphragm or plunger which is movable by the engine suction to cut a resistor into the electric circuit against the action of a return spring which latter will function to cut out the resistor when the vacuum drops below a predetermined level, as during the acceleration of the engine for a higher speed of car travel. With the resistor excluded by a shunt connection, the electric cleaner motor will accelerate by reason of an unrestricted supply of the electric current. With the resistor functioning in the motor circuit, as during intervals of manifold vacuum above a predetermined value, and as in slow or moderately fast travel, the wiper motion will be retarded while wear on the mechanism and heating of the electric motor are kept at a minimum.

A manual control is provided to start and stop the windshield cleaner independently of the automatic speed control. This enables the motorist to have a constant speed operation of the wiper, a speed selection being possible, such as a top speed for use in an exceptionally heavy downpour, or a low speed for use in a light rain. The vehicle may be driven at any speed with high or low wiper speeds available whenever desired.

The invention will also be found to reside in an electric windshield cleaner of simple design and embodying engine responsive means for varying the speed of wiper operation with changes in engine speed, and to accomplish the change through an automatic control for better electric wiping performance.

The foregoing and other objects will manifest themselves as this description progresses, reference being made therein to the accompanying drawings wherein Fig. 1 is a plan view of the windshield of a motor vehicle showing the improved cleaner associated therewith;

Fig. 2 is a fragmentary side elevation of the power unit of the windshield cleaner, portions being broken away;

Fig. 3 is a detailed sectional view through the parking switch;

Fig. 4 is a bottom plan view of the driving crank arm showing more clearly its relation to the parking switch actuator;

Fig. 5 is an elevation of the pressure responsive unit;

Fig. 6 is a vertical section through the unit about on line VI—VI of Fig. 5;

Fig. 7 is a longitudinal sectional view through the manual selector switch;

Fig. 8 is a detailed perspective view of the movable contact element of the selector switch;

Fig. 9 is a wiring of the several electric circuits;

Fig. 10 is a schematic showing of a modified automatic control; and

Fig. 11 is a further modification showing a manual form of control.

Referring more particularly to the accompanying drawings, the numeral 1 designates the curved windshield of a motor vehicle, 2 the wipers or blades which are carried by actuating arms 3 on rockshafts 4 which in turn are connected by linkage 6 to driving rocker arms 7. An electric motor 8 is detachably mounted on the transmission housing 9 and carries a worm 11 on its vertically disposed shaft 12, or on a detachable extension 12' thereof, in mesh with the two laterally positioned worm gears 13 to which the driving rocker arms 7 are fixedly related. The transmission housing is divided on a horizontal plane, as indicated at 14, to provide upper and lower sections which have their abutting edges provided with journal bearings for the stub shafts 15 of the gears. This housing design affords a construction the sections of which may be readily and economically die cast and one in which the cavity of the lower section serves to hold a supply of lubricant while enabling access to the gears upon the removal of the upper section. The lower section alone is provided with mounting ears 91 to enable the upper section being removed without disturbing the mounting. The axes of the two shafts 15 are relatively angularly displaced to dispose them substantially normal to the respective portions of the windshield served by them. The shaft extension 12' and the motor shaft 12 may be joined by a key pin 17 of hexagonal cross section slidably fitting opposed sockets in the shaft and its extension for separating easily when demounting the motor.

The electric motor may be of suitable design and for this disclosure it is of shunt field type with resistance inserted in armature circuit for reduction of speed. It is connected in circuit with a source of electrical energy 19 by wires 20 and 21. Included in the circuit is a manual control in the form of a switch 22 having a movable contact member 23 and a plurality of fixed contacts to be more fully described hereinafter. Connectible into circuit relation with the motor by this control 22 are a parking switch 26, an automatic speed selecting switch 38, and a current modifying device 35.

The wiper may be manually operated in the conventional manner. Normally, the manual control is in a parked position where it is retained by a spring detent 31 engaging in the proper one of a series of notches 32 formed in the shank 33 of a hand knob 24. By pulling out on the knob to a running position, as determined by the detent engaging in a second notch, the motor will become energized to operate the wiper 2 at a given constant speed, the motor circuit being established through wires 20, 21. In accordance with one phase of the invention, a second wiper operating speed is provided, preferably slower than the first, and this is secured by withdrawing the knob 24 to a second running position, as determined by engaging the detent in a third notch in the shank, the result of which is to bring a current modifying device in the form of a resistor 35 into a second motor circuit comprising wires 20 and 34. This resistor unit is designed to provide a constant speed of wiper operation that is relatively slower than that afforded by the fast speed circuit 20, 21. In lieu of a fixed resistor unit an adjustable one may be incorporated in the circuit, such as the well known rheostat, to provide for a graduated speed change in the wiper operation. The term resistor is therefore used herein comprehensively to include a rheostat or other current modifier capable of adjustment in this capacity.

For the automatic regulation of the wiper speed, the hand knob 24 is fully withdrawn where it is held by the detent engaging in the fourth notch 32. In this position the windshield cleaner system is set for automatic operation, i. e. one wherein the wiper speed is increased as the speed of travel is increased. An illustration of such an automatic control is shown in Figs. 5 and 6 wherein a pressure switch 38 is shown as having a fixed contact 38' and a cooperating movable contact 39 carried by a pressure responsive member, such as the diaphragm 40, operating within a chamber 41. The chamber is evacuated through a port 42 and a suction line 43 communicating with the intake manifold of the vehicle engine in a well known manner. The port 42 opens through a normally open atmospheric port 44 that is closable by a valve 45, and also through a suction port 46 that is normally closed to the suction line by a valve 47 under the urge of a spring 48. The tension of this spring may be adjusted by threading the nipple 49 into the housing 50 for determining the pressure differential under which the valve 47 will open to the suction line. A stem 51 joins the two valves 45 and 47 for movement as a unit to have one valve unseat when the other seats. The switch contacts 38' and 39 are normally held closed by a spring 52 to close the circuit through wires 20, 21 when the suction influence is low, under which condition the motor circuit connections will shunt the resistor 35 and cause the wiper to operate at high speed. On the other hand, if the suction influence is high, as when the engine throttle is closed more or less, the valve unit 45, 47 will shuttle to open the diaphragm chamber 41 to the suction and close off the atmospheric communication whereupon the diaphragm will retract contact 39 from the fixed contact 38' to open the high speed circuit and cause the electric current to flow through the current modifying resistor for retarding the wiper action. This response of the valve unit to the pressure differential will be facilitated by a piston element 47' on the unit having a limited clearance with the passage wall.

The manually presettable control switch 22 has a body with a chamber 18 in which are located four sets of fixed contacts A, B, C and D for being wiped by the multi-fingered movable contact 23, the fingers of which are all electrically connected to close the circuit between such contacts as and when wiped. Fig. 9 shows in plan the four sets of contacts from which it will be noted that the fixed contact A is of bar type and has four contact points A1, A2, A3 and A4, all connected in the circuit wire 20. The fixed contact B is connected to the battery 19 and likewise has four contact points B1, B2, B3 and B4 with the latter three being electrically connected, and with contact B1 being independent of the others but connectible thereto through the parking switch 26. Fixed contact C has electrically interconnected contact points C1, C2 and C4 connected to the wire 21, contact C4 being subject to disconnection by the automatic switch 38. Fixed contact D is in circuit connection with the resistor 35 and has two electrically connected contact points D3 and D4. In its parked position the movable contact 23 electrically connects contact points A1, B1 and C1; in its full running position it connects points A2, B2 and C2; in its slow speed running position it connects points A3, B3 and D3; and in its automatic position it connects all four points A4, B4, C4 and D4. The current which supplies the fixed contact B divides and part goes through contact A and wire 20 to the motor field 16 and part through either contact C and the wire 21 or contact D and the wire 34 to the motor armature 16'.

The parking switch 26 includes a depressible stem 27 urged outwardly by a spring 28 to close the circuit through contacts 29 and 30. The stem is positioned to be wiped by a cam lug 25 carried on one of the driving rocker arms 7 so as to break the circuit at the proper point in the cycle of operation to bring the wipers to a position of rest at the lower side of the windshield. The cam lug may be displaceable by suitable means for normal wiper operation to avoid depressing the switch stem 27 if desired, although such depression will not be effective unless the control switch 22 is in its parking position.

Therefore, the manual control switch 22 serves to select the parking, the wiper speed, and also the automatic control of the wiper. When in the parked position the movable contact 23 closes the motor circuit only when the parking switch is closed, at which time the current passes from contact point B1 to point A1 and also to point C1 to complete the motor circuit to the battery through wires 20 and 21. In position No. 2 the contact 23 closes the circuit through the same wires by bridging contact points A2, B2 and C2. In position No. 3 the movable contact bridges contact points A3, B3 and D3 to include the resistor 35 in the motor circuit, the circuit through wire 21 being otherwise interrupted. In position No. 4 the movable contact bridges contact points A4, B4 and D4, with contact point C4 functioning only when the pressure responsive switch 38 is in its normally closed position so that the wiper speed will be normally fast because of the shunted relation of the resistor 35. Only when the manifold suction is sufficiently high to open the automatic switch 38 will the resistor function to retard the wiper speed in accordance with the slower vehicular speed which is productive of a switch responsive suction.

The circuit connections to the automatic speed selecting switch 38 may be made through the terminal plates 38a and 39a while the circuit connections to the parking switch may be readily established through the terminals 29a and 30a.

In the embodiment shown in Fig. 10 a modified form of automatic control is shown wherein a rotataing part of the vehicle power-plant is utilized to impress itself through the centrifugal force therein to close a control switch 57 for shunting the resistor. Such rotating part is shown in the form of the shaft 53 of a generator 54. Fixed to this shaft is a centrifugal governor which serves to slide the actuator 56 along the shaft to open the switch by separating the switch points 57. The centrifugal governor may be of any suitable form and is here shown as having flat spring strips 58 supporting weights 59 for responsive action to centrifugal force in retracting the actuator 56 from the switch finger 60 to permit its contact 57 moving into circuit closing relation with the companion contact on the upright 60' to thereby shunt the resistor for increasing the wiper speed.

Fig. 11 shows another control unit of the vehicle in the form of an accelerator pedal 63 which is pivotally mounted at 64 for being depressed by the foot to axially shift the throttle stem 65 in a manner to move the normally separated contacts 66 into a circuit closing and resistor-shunting relation.

This automatic closing of the high speed circuit to obtain faster wiper operation, when accelerating the vehicle to pass another vehicle proceeding in the same direction, may therefore be performed in several ways. The windshield cleaner may be actuated in the conventional manner to obtain either fast or slow wiper speeds of operation, and to park the wiper when desired. When the automatic speed selecting switch is brought into the windshield cleaning system, the speed variation is momentarily changed in response to the rate of acceleration to give the driver clear vision ahead in overtaking a vehicle and thereafter the wiper speed may be restored to a desired slower operation. Or, the wiper operation may be accelerated in accordance with the speed of the motor vehicle and sustained at high speed for continued fast travel. The selected speeds of wiper operation is preferably constant and definite, and while only two such speeds are herein illustrated, it is obvious that other speed selections may be made by varying the modifying action of the resistor means.

The improved windshield cleaner system is practical in that it will avoid unnecessary wear and tear on the mechanism and at the same time provide adequate wiping action for safe driving and, in the event of either excessive precipitation or a light drizzle, the automatic action may be replaced by the conventional manual control in accordance with the desires of the motorist. By properly setting the manual start-stop switch 22, the windshield cleaner system can be converted from an automatic speed compensating wiper system to a manually selective wiper system. The automatic system is responsive directly to the control in Fig. 11, wherein the accelerator pedal positively closes the high speed circuit, but may respond indirectly to the control as in the preferred showing of Figs. 1 through 9, as well as in the showing of Fig. 10, wherein the changes in the manifold pressure and in the centrifugal force act to close a controlling circuit for adjusting the wiper speed.

If the electric motor is of the type with a compound winding, the resistors may be eliminated and the speed regulation accomplished by alternate use of only the series field, or combined use of both series and shunt field windings. If the electric motor is of a shunt wound type, the speed regulation may be accomplished by the alternate use of a resistor in the field circuit to speed up the motor, or by full field excitation without resistor for reduced speed of operation. Thus it will be seen that the automatic regulation may be accomplished through the use of a resistor or a rheostat, or by use of various motor windings; and whichever may be used for reducing the voltage to the field, or to the armature, will modify the speed of the electric motor. The motor in the illustrated embodiment has a control circuit which causes it to run at a reduced speed by using a resistor in the armature circuit, and the changeover to the increased speed is effected by closing a switch to short circuit this resistance.

While the foregoing description has been given in detail it is without thought of limitation since the inventive principles involved are capable of assuming other physical embodiments without departing from the spirit of the invention and the scope of the appended claims.

What is claimed is:

1. In an electrically driven windshield wiper installation for use on a motor vehicle propelled by an internal combustion engine, said electrical windshield wiper having a manually operable speed regulating control switch operable to obtain relatively high and low speeds of wiper operation, and an additional control switch responsive automatically to changes in the engine intake manifold suction for effecting windshield motor operation at its higher speed limit automatically with a lessening of intake manifold vacuum.

2. In an electrically driven windshield wiper installation for use on a motor vehicle propelled by an internal combustion engine, said electrical windshield wiper having a manually operable speed regulating control switch, and an additional control switch operable automatically to increase the speed of wiper operation by movements of the engine control throttle mechanism beyond a predetermined position for increasing the accelerative power of said engine.

3. The combination with an electrically driven windshield wiper, including an electric motor of an automatic regulator therefor connected with the fuel-air mixture induction system for the power plant of the vehicle, said regulator comprising contact points, means operable by closing said contacts for varying the flow of electric current from a source to the windshield wiper motor, a pressure responsive element operable with acceleration of said engine to close the said circuit for accelerating the speed of the wiper, and means manually operable to the exclusion of said element for effecting the same acceleration of speed of the wiper independently thereof.

4. An electrically driven windshield wiper having an electric motor, in combination with the engine of a motor vehicle, a control for the electric motor including an element responsive to the speed of a moving part of the engine of the motor vehicle to obtain relatively high and low speeds of wiper operation, and a switch operable by said moving part for effecting varying circuit conditions in the motor to modify its speed of wiper operation while said element is responding to an increase in the speed of said moving part, and thereby to obtain two differently, but fixed speeds of wiper operation.

5. In combination with the engine of a motor vehicle, an electrically driven windshield wiper having an electric motor connected in plural circuits each for a normally fixed speed of wiper operation that is different from that of the other circuit, and a switch responsive to accelerative effort of the engine for selectively connecting the said motor in one circuit or the other.

6. In combination with the engine of a motor vehicle, an electrically driven windshield wiper having an electric motor connected in plural circuits each for a normally fixed speed of wiper operation that is different from that of the other circuit, a switch responsive to accelerative effort of the engine for selectively connecting the said motor in one circuit or the other, a second switch manually operated to selectively close said circuits, and means operable to render one switch inoperative when the other switch is being operated.

7. In combination with the engine of a motor vehicle, an automatic speed regulator for electrically driven windshield wipers, a regulating element connected to a moving part of the vehicle rotatably connected to the engine, the said element having a spring returned part responsive to centrifugal force to counteract the said spring pressure, the said element comprising multiple contacts to conduct electric current from a source, said contacts being connected to means for varying the flow of electric current from the source for the windshield wiper motor to automatically regulate the speed of the windshield wiper in accordance with the speed of motion of said moving part.

8. A windshield cleaner for motor vehicles, comprising an oscillatory wiper, an electric motor operatively connected thereto, circuit means for the motor by which the speed of the wiper may be regulated for relatively high and low wiper speeds, and wiper speed regulating means movable in response to vehicular operation for actuating the circuit means.

9. A windshield cleaner for motor vehicles, comprising an oscillatory wiper, an electric motor operatively connected thereto, circuit means for the motor by which the speed of the wiper may be regulated for either fast or slow speeds of wiper operation, a driving control for the vehicle operable to accelerate the latter, and means adjustably positioned in response to the vehicle control for actuating the circuit means to effect a faster wiper speed when the driving control is used beyond a predetermined position to so accelerate the vehicle.

10. A windshield cleaner for motor vehicles comprising an oscillatory wiper, an electric motor operatively connected thereto, circuit means for the motor by which the speed of the wiper may be regulated for either fast or slow speeds of wiper operation, a driving control for accelerative effort of the vehicle engine, and means adjustably positioned in response to the driving control for actuating the circuit means for varying the wiper speed in accordance with the said accelerative effort of the engine to enable a faster wiper operation when the vehicle engine is accelerated.

11. In a windshield wiper mechanism driven by an electric motor, control means for operating the motor at a relatively constant speed, motor regulating means operable for effecting a substantial increase in the speed of said motor, and automatic means responsive to predetermined changes in the speed of the motor vehicle and connected to the motor regulating means for varying the wiper speed accordingly.

12. The combination with the power plant of a motor vehicle and an electrically driven windshield wiper including an electric motor normally connected in an energizing circuit with a source of electric current for operating the wiper at one speed, said energizing circuit containing a resistor, a resistor shunting bypass circuit for actuating the wiper at a faster speed, of an automatic speed regulator for the motor included in the bypass circuit and responsive to the acceleration of the said power plant to shunt out the resistor for accelerating the speed of the wiper.

13. A windshield cleaning system for motor vehicles having a power plant and a control therefor, said system comprising a wiper, an actuating mechanism connected to the wiper, an electric motor connected to the mechanism for operating the same, a source of electrical energy, a manual start-stop switch connected in an energizing circuit with the source and the motor to selectively obtain relatively high and low wiper speeds of operation, and a current modifier responsive to the control to vary the current supplied to the motor for regulating the speed of wiper operation.

14. A motor vehicle having a power plant and a manipulative control therefor, a windshield wiper, an electric motor connected for operating the wiper, a manual speed regulating switch means associated with the said electric motor and operable to selectively vary the wiper speed for relatively high and low speeds, and means responsive to the functioning of the power plant control for actuating the switch means to increase the wiper speed accordingly with power plant acceleration.

15. The combination with a motor vehicle having a manipulative control, and a windshield wiper system having an electric motor having a rotary shaft connected to the wiper of the system, a speed control selectively operable to obtain relatively high and low wiper speeds, of speed regulating means responsive to the control and connected in circuit with the motor to automatically vary the speed of the latter in regulation of the wiper speed according to an acceleration of the motor vehicle.

16. In an electrically driven windshield wiper for use on a motor vehicle, said windshield wiper having a motor designed for two speeds of operation, and having a manually operated control for starting and stopping, and for selectively operating the said motor at either of its said two speeds of operation, automatic means operable for changing the motor operation from one of its speeds to another, and means responsive to normal operation of the motor vehicle for automatically effecting sudden changes back and forth from one of said motor speeds to the other in accordance with vehicle acceleration and deceleration.

17. In an electrically driven windshield wiper for use on a motor vehicle, said windshield wiper having a motor designed for two speeds of operation, a manually operated control for starting and stopping and for selectively operating the said motor at either of its said two speeds of operation, and means responsive to normal operation of the motor vehicle for automatically effecting sudden changes back and forth from one of said motor speeds to the other in accordance with vehicle acceleration and deceleration.

References Cited in the file of this patent

UNITED STATES PATENTS

| | | |
|---|---|---|
| 2,264,013 | Webb | Nov. 25, 1941 |
| 2,376,010 | Sacchini et al. | May 15, 1945 |
| 2,499,298 | Christensen | Feb. 28, 1950 |